(12) United States Patent
Chapman

(10) Patent No.: US 7,328,911 B2
(45) Date of Patent: Feb. 12, 2008

(54) AIRBAG FASTENER

(75) Inventor: Stephen Chapman, Oak Ridge, NC (US)

(73) Assignee: TK Holdings Inc., Auburn Hills, MI (US)

( * ) Notice: Subject to any disclaimer, the term of this patent is extended or adjusted under 35 U.S.C. 154(b) by 456 days.

(21) Appl. No.: 10/878,494

(22) Filed: Jun. 29, 2004

(65) Prior Publication Data

US 2005/0029789 A1     Feb. 10, 2005

Related U.S. Application Data

(60) Provisional application No. 60/483,974, filed on Jul. 1, 2003.

(51) Int. Cl.
*B60R 21/16* (2006.01)
(52) U.S. Cl. ............................... 280/728.2; 280/730.2; 280/743.2; 280/749
(58) Field of Classification Search ............. 280/743.2, 280/730.2, 749, 728.2
See application file for complete search history.

(56) References Cited

U.S. PATENT DOCUMENTS

| 5,464,250 | A | * | 11/1995 | Sato ........................ 280/743.1 |
| 6,022,044 | A | * | 2/2000 | Cherry ..................... 280/730.2 |
| 6,070,904 | A | * | 6/2000 | Ozaki et al. ............. 280/743.1 |
| 6,206,409 | B1 | | 3/2001 | Kato et al. |
| 6,626,456 | B2 | | 9/2003 | Terbu et al. |
| 7,083,188 | B2 | * | 8/2006 | Henderson et al. ...... 280/730.2 |
| 7,125,037 | B2 | * | 10/2006 | Tallerico et al. ......... 280/728.2 |
| 7,163,231 | B2 | * | 1/2007 | Kumagai .................. 280/730.2 |
| 2002/0020995 | A1 | | 2/2002 | Abe et al. |
| 2002/0163169 | A1 | * | 11/2002 | Fischer ..................... 280/730.2 |

FOREIGN PATENT DOCUMENTS

| EP | 0 783 995 A1 | 7/1997 |
| WO | WO 03/080393 A2 | 10/2003 |

* cited by examiner

*Primary Examiner*—Eric Culbreth
(74) *Attorney, Agent, or Firm*—Foley & Lardner LLP

(57) ABSTRACT

An airbag device includes an airbag configured to inflate in an event of a vehicle emergency and a retention mechanism for securing the airbag in a folded storage position. The retention mechanism includes a strap wrapped around a portion of the airbag and a slit that engages a tab for securing the strap in position.

42 Claims, 9 Drawing Sheets

AIRBAG FASTENER

CROSS-REFERENCE TO RELATED PATENT APPLICATIONS

This application claims priority to and the benefit of U.S. Provisional Application No. 60/483,974, filed Jul. 1, 2003, which is incorporated by reference herein.

BACKGROUND

The present invention relates to an airbag device. More particularly, the present invention relates to a side curtain airbag device that includes a non-adhesive retention mechanism for securing a side curtain airbag.

Side curtain (or side impact) airbag devices are designed to inflate to protect a vehicle occupant from a lateral impact with a side of the vehicle's interior. For example, side impact protection may be required when another vehicle collides with the side of the occupant's vehicle or when the occupant's vehicle loses control and rolls over causing the side of the vehicle to repeatedly impact the ground. During a rollover event, an inflated side curtain airbag may also prevent the occupant's head from emerging through a vehicle window opening.

Side curtain airbag devices are typically stored within a vehicle roof rail and are enclosed by interior trim work. In the stored state, a deflated side curtain airbag is folded and fastened to a bracket that is affixed directly to the vehicle structure. The airbag is often enclosed in a fabric casing (or bag cover) and may have a protector cloth disposed between the airbag and the bracket to protect the airbag from punctures. Conventional side curtain airbag devices typically include a retention mechanism configured to wrap around the folded airbag to secure the airbag in position against the bracket or to secure the protector cloth around the airbag. Adhesive tape is typically used as the retention member.

One disadvantage of conventional retention devices is that the tension and application consistency of tape is difficult to control, particularly in a high volume manufacturing environment. The resulting inconsistency reflects poorly on perceived product quality. Moreover, tape cannot be manufactured by the airbag manufacturer and must therefore be procured from vendors. However, commercial adhesives are expensive and add complexity and cost to the material procurement process.

Thus, a need exists for a cost-effective retention mechanism to improve consistency of side curtain airbag device construction and to improve uniformity of side curtain airbag device quality.

SUMMARY

According to an aspect of the present invention, an airbag device is provided. The airbag device includes an airbag configured to inflate in an event of a vehicle emergency and a retention mechanism for securing the airbag in a folded storage position. The retention mechanism includes a strap wrapped around a portion of the airbag and a slit that engages a tab for securing the strap in position.

According to another aspect of the present invention, an airbag device is provided. The airbag device includes an airbag configured to inflate in an event of a vehicle emergency, a bracket for attaching the airbag to a vehicle structure, and a retention mechanism for securing the airbag in a folded storage position. The retention mechanism includes a strap wrapped around a portion of the airbag and a portion of the bracket.

BRIEF DESCRIPTION OF THE DRAWINGS

The accompanying drawings, which are incorporated in and constitute a part of this specification, illustrate embodiments of the invention and together with the description serve to explain the principles of the invention.

DETAILED DESCRIPTION

FIGS. 1-4 show a first embodiment of an airbag device 10 according to the present invention. The airbag device 10 includes an airbag 20 and a retention mechanism 30.

Figure 2:
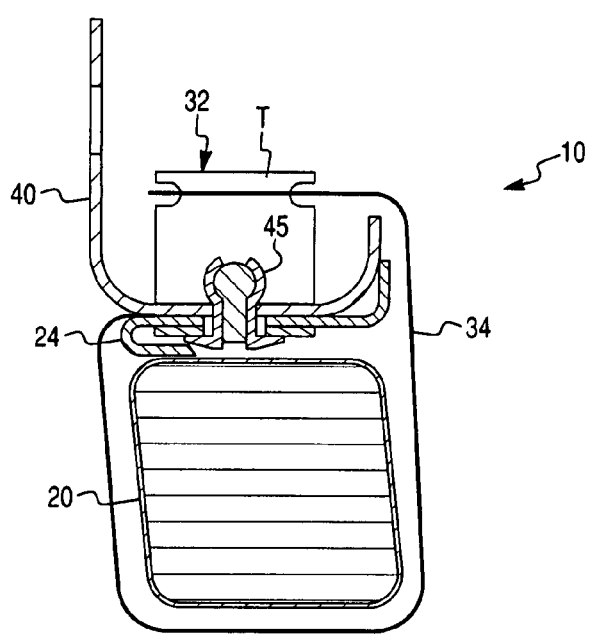
FIG. 2 is a cross sectional side view taken along the line 2-2 in FIG. 1.
Figure 3:
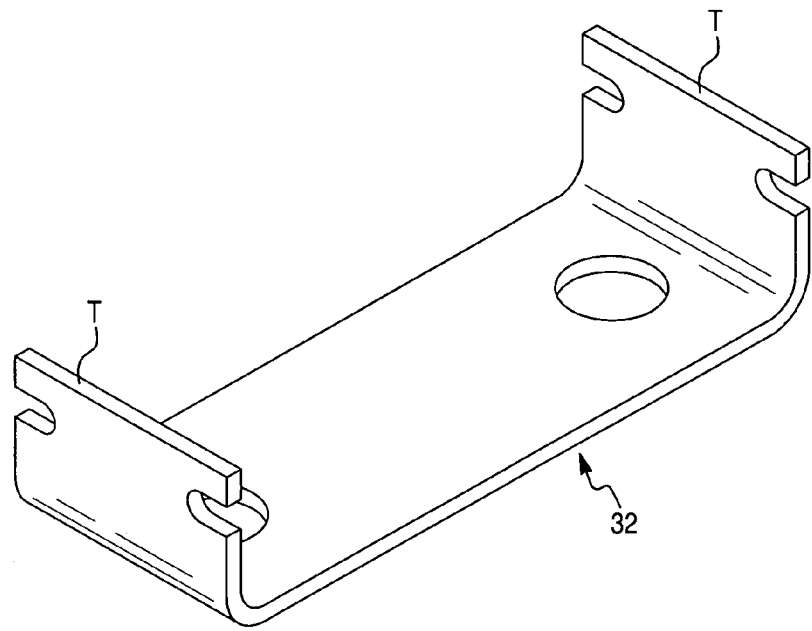
FIG. 3 is a perspective view of a fastening member of FIG. 1.
Figure 4:
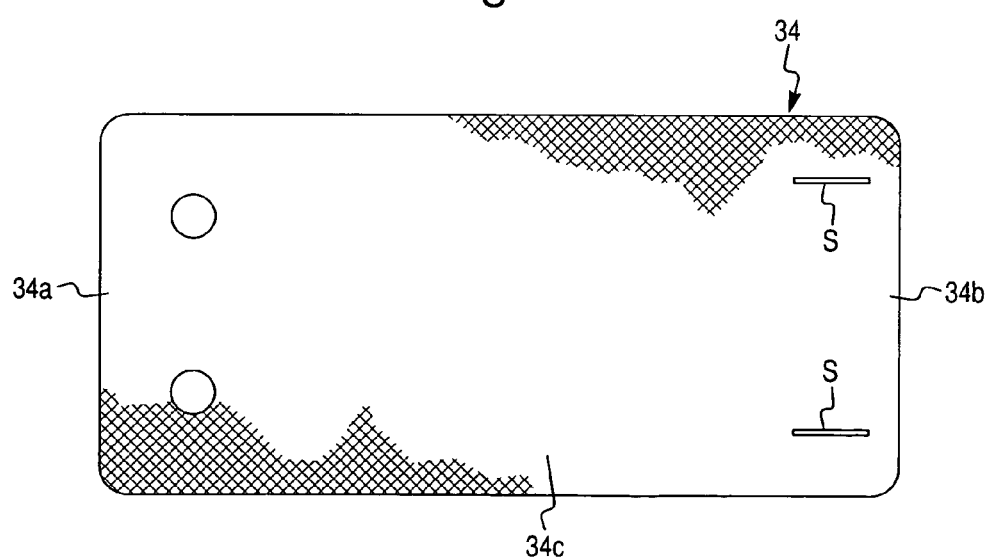
FIG. 4 is a top plan view of a strap of FIG. 1.
Figure 5A:
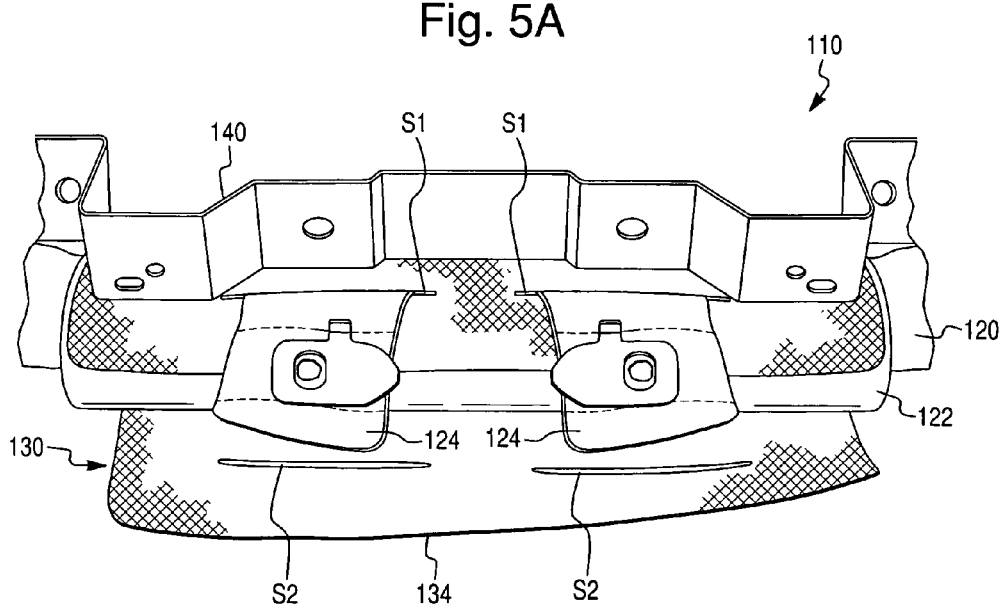
FIG. 5A is a perspective view of an embodiment of an airbag device according to the present invention showing attachment of a first end of a strap to an airbag.
Figure 5B:
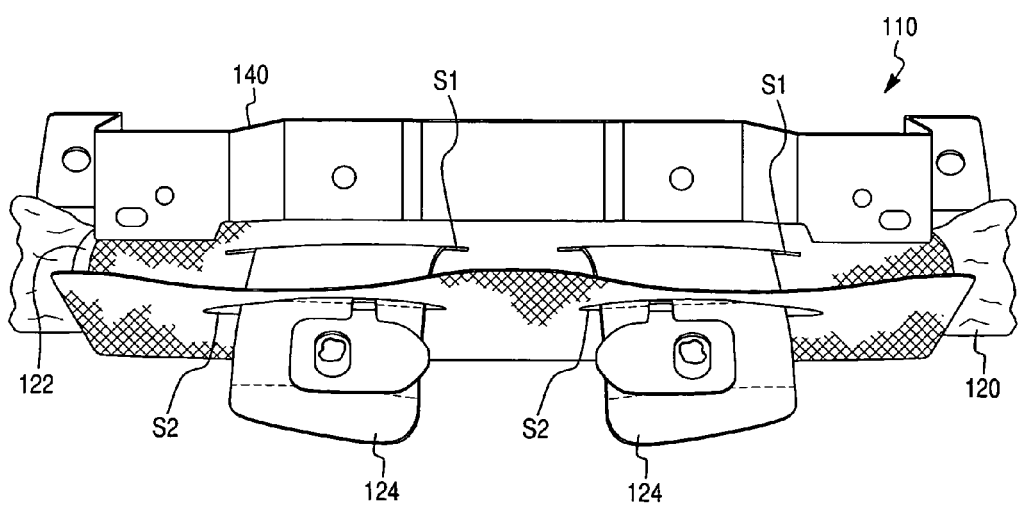
FIG. 5B is a perspective view of the airbag device of FIG. 5A showing attachment of a second end of the strap to the airbag.
Figure 5C:
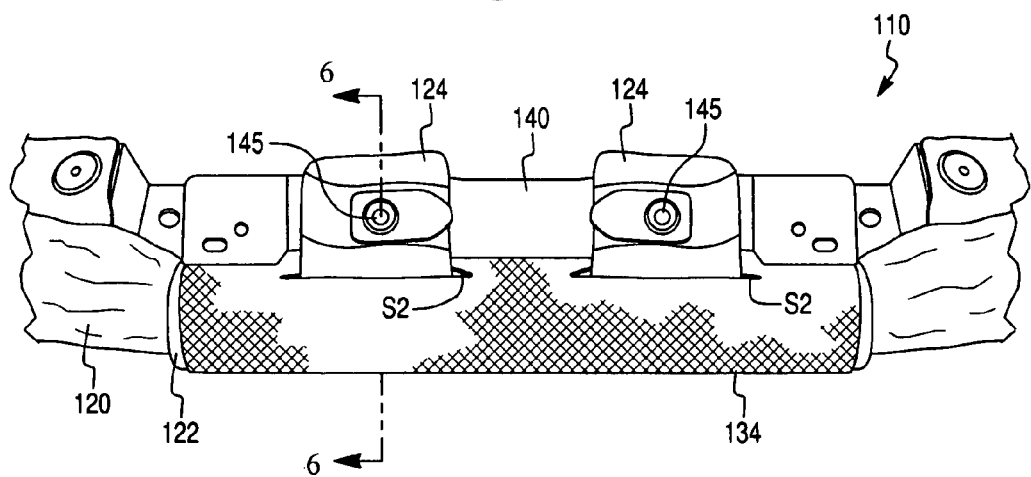
FIG. 5C is a perspective view of the airbag device of FIGS. 5A and 5B showing attachment of the strap and the airbag to a bracket.
Figure 6:
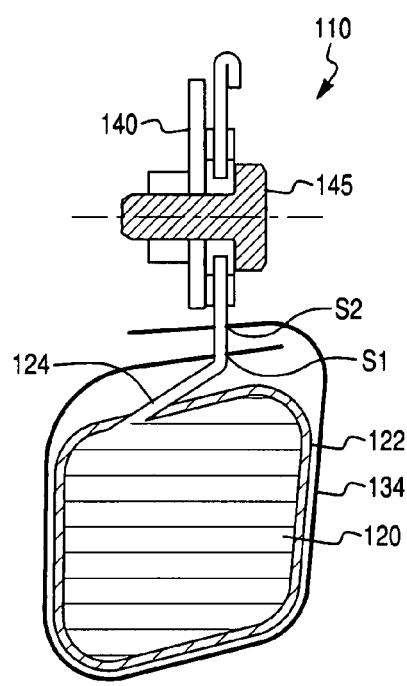
FIG. 6 is a cross sectional side view of the airbag device of FIG. 5C taken along the line 6-6 in FIG. 5C.

The airbag 20 is configured to be stored in a vehicle in a folded state and to inflate in an event of a vehicle emergency to protect a vehicle occupant. The airbag 20 is preferably a side curtain airbag. When folded, the airbag 20 may optionally be encased in a cover, such a tube-shaped fabric casing or bag cover (not shown). The airbag 20 includes an airbag tab 24 for connecting the airbag 20 to a bracket 40. As shown in FIG. 2, the airbag tab 24 may be fastened to the bracket 40 with a fastener 45. The fastener 45 may be any suitable fastener but is preferably a rivet. The bracket 40 may then be attached to a vehicle structure, such as a roof rail or pillar, so that the airbag 20 is securely installed in the vehicle. Alternatively, the airbag tab 24 of the airbag 20 may be attached directly to the vehicle structure so that the bracket 40 is eliminated.

The retention mechanism 30 is configured to secure the folded airbag 20 in position against the bracket 40 without the use of an adhesive, such as tape. The retention mechanism 30 includes a fastening member 32 (shown in FIG. 3) and a strap 34 (shown in FIG. 4). The fastening member 32 and the strap 34 are connected to the bracket 40. For example, the fastening member 32 and the strap 34 may be connected to the bracket 40 by the fastener 45, as shown in FIG. 2. Alternatively, the fastening member 32 may be integral with the bracket 40, and the strap 34 may be integral with the airbag 20 or with an airbag casing or "sock."

The fastening member 32 is preferably made of metal and is sized and shaped to accommodate placement of the airbag 20 in the vehicle. The fastening member 32 can be formed by any known method such as, for example, stamping. The strap 34 is formed of fabric. The fabric may be any fabric suitable for use in an airbag application but is preferably a woven, non-woven, or film material.

Figure 1:
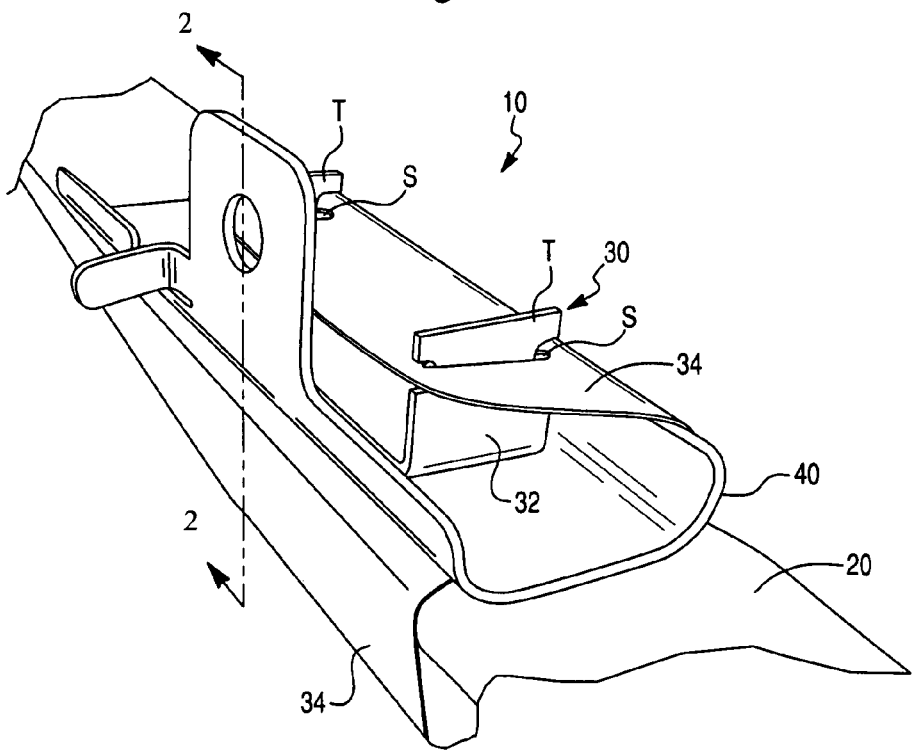
FIG. 1 is a perspective view of an embodiment of an airbag device according to the present invention.

The strap 34 includes a first end 34*a* that is attached to the bracket 40, a second end 34*b* that is configured to engage the fastening member 32, and a central portion 34*c* disposed between the first end 34*a* and the second end 34*b*. When the strap 34 is attached to the bracket 40, the strap 34 is configured to wrap around a portion of the airbag 20 and to fasten to the fastening member 32, as shown in FIGS. 1 and 2. For example, the second end 34*b* of the strap 34 may include slots S configured to receive corresponding projections or tabs T disposed on the fastening member 32.

In operation, the fastening member 32, the strap 34, and the airbag 20 are connected to the bracket 40 by the fastener 45. The strap 34 is wrapped about the airbag 20 and fastened to the fastening member 32 by hooking the slots S over the bracket tabs T of the fastening member 32, as shown in FIG. 2. When the strap is wrapped about the airbag 20 and fastened to the fastening member 32, the airbag 20 is secured in position against the bracket 40. The strap 34 may also include a tear seam (not shown) to enable the strap 34 to rupture during inflation of the airbag 20 thereby enabling the airbag 20 to deploy.

The above-described embodiment is preferred for use with a side curtain airbag bracket.

FIGS. 5A-7 show a second embodiment of an airbag device 110 according to the present invention. The airbag device 110 includes an airbag 120 and a retention mechanism 130. The airbag device 110 is similar to the previous embodiment except the retention mechanism 130 does not include the fastening member 32. In contrast, the retention mechanism includes only a strap 134 configured to secure a protector cloth 122 about the airbag 120.

Figure 7:
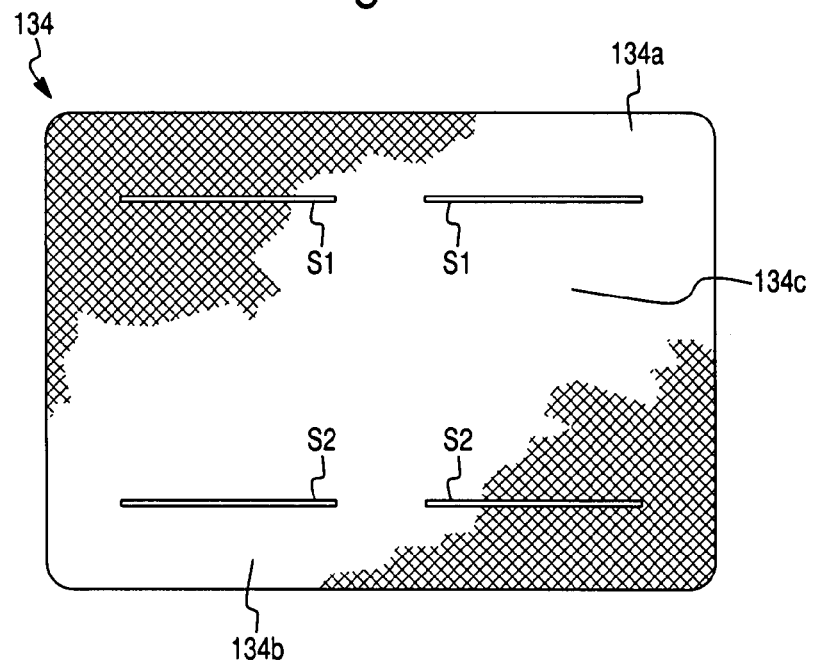
FIG. 7 is a top plan view of the strap of FIG. 6.

The strap 134 includes a first end 134*a*, a second end 134*b*, and a central portion 134*c* disposed between the first and second ends 134*a* and 134*b*. As shown in FIG. 7, the first end 134*a* of the strap 134 includes slots S1, and the second end 134*b* of the strap 134 includes slots S2. The slots S1 and S2 enable the strap 134 to attach to the airbag 120 so that the strap 134 can be secured about the airbag 120.

In operation, the protector cloth 122 is wrapped around a portion of the airbag 120 so that the protector cloth 122 is disposed between the airbag 120 and the bracket 140. The slots S1 of the strap 134 are engaged with airbag tabs 124 by inserting the airbag tabs 124 in the slots S1 (shown in FIG. 5A). The strap 134 is then wrapped about the airbag 120 and the protector cloth 122, and the airbag tabs 124 are inserted into the slots S2 (shown in FIG. 5B). After the slots S1 and the slots S2 are engaged with the airbag tabs 124, the airbag tabs 124 are connected to a bracket 140 with a fastener 145 such as a bolt (shown in FIG. 5C). In this manner, the strap 134 secures the protector cloth 122 about the airbag 120. The bracket 140 may then be connected to a vehicle structure to thereby securely install the airbag 120 in a vehicle.

The above-described embodiment is preferred for use with a side curtain airbag bracket having an anti-twist configuration.

Figure 8:
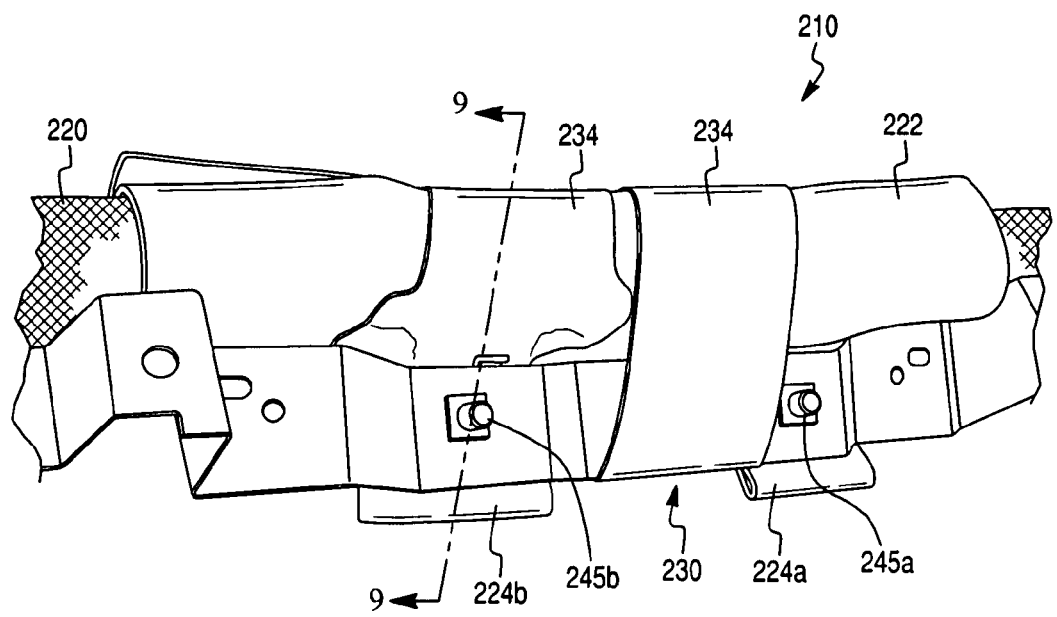
FIG. 8 is a perspective view of an embodiment of an airbag device according to the present invention.
Figure 9:
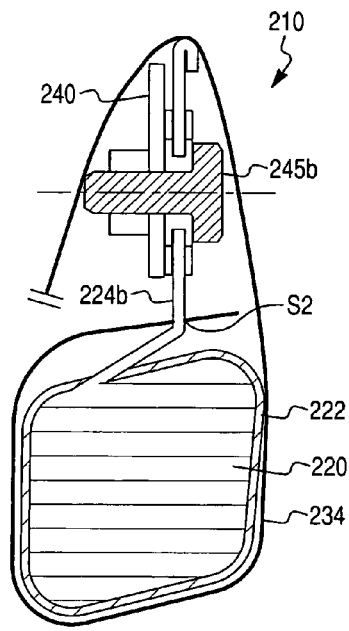
FIG. 9 is a cross sectional side view taken along the line 9-9 of FIG. 8.
Figure 10:
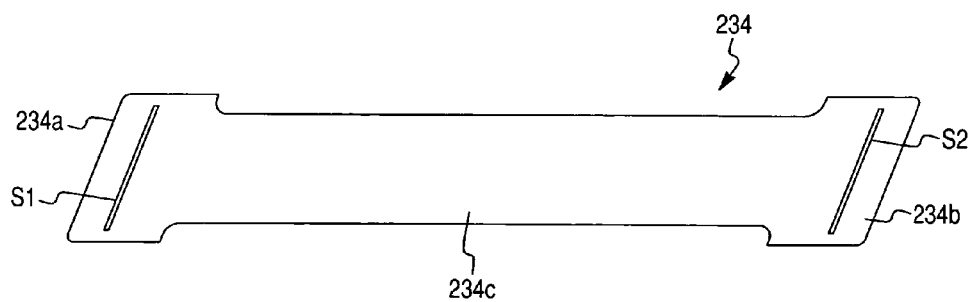
FIG. 10 is a top plan view of the strap of FIG. 8.

FIGS. 8-10 show a third embodiment of an airbag device 210 according to the present invention. The airbag device 210 includes an airbag 220 and a retention mechanism 230. The airbag device 210 is similar to the previous embodiments except the retention mechanism 230 is configured to wrap about the airbag 220, a protector cloth 222, and a bracket 240.

The retention mechanism 230 includes a strap 234 with a first end 234*a*, a second end 234*b*, and a central portion 234*c* disposed between the first and second ends 234*a* and 234*b*. As shown in FIG. 10, the first end 234*a* of the strap 234 includes a slot S1, and the second end 234*b* of the strap 234 includes a slot S2. The slots S1 and S2 enable the strap 234 to attach to the airbag 220 so that the strap 234 can be secured about the airbag 220, the protector cloth 222, and the bracket 240, as shown in FIGS. 8 and 9.

In operation, the protector cloth 222 is wrapped around a portion of the airbag 220. The slot S1 of the strap 234 is engaged with a first airbag tab 224*a* by inserting the airbag tab 224*a* in the slot S1. The first airbag tab 224*a* is then connected to the bracket 240 with a first fastener 245*a* such as a bolt. The strap 234 is wrapped about the airbag 220, the protector cloth 222, and the bracket 240, as shown in FIG. 8, and a second airbag tab 224*b* is inserted into the slot S2. After the slot S2 is engaged with the second airbag tab 224*b*, the second airbag tab 224*b* is connected to the bracket 240 with a second fastener 245*b* such as a rivet. In this manner, the strap 234 secures the protector cloth 222 about the airbag 220 and secures the airbag 220 to the bracket 240. The bracket 240 may then be connected to a vehicle structure to thereby securely install the airbag 220 in a vehicle.

The above-described embodiment is preferred for use with a side curtain airbag bracket.

Figure 11:
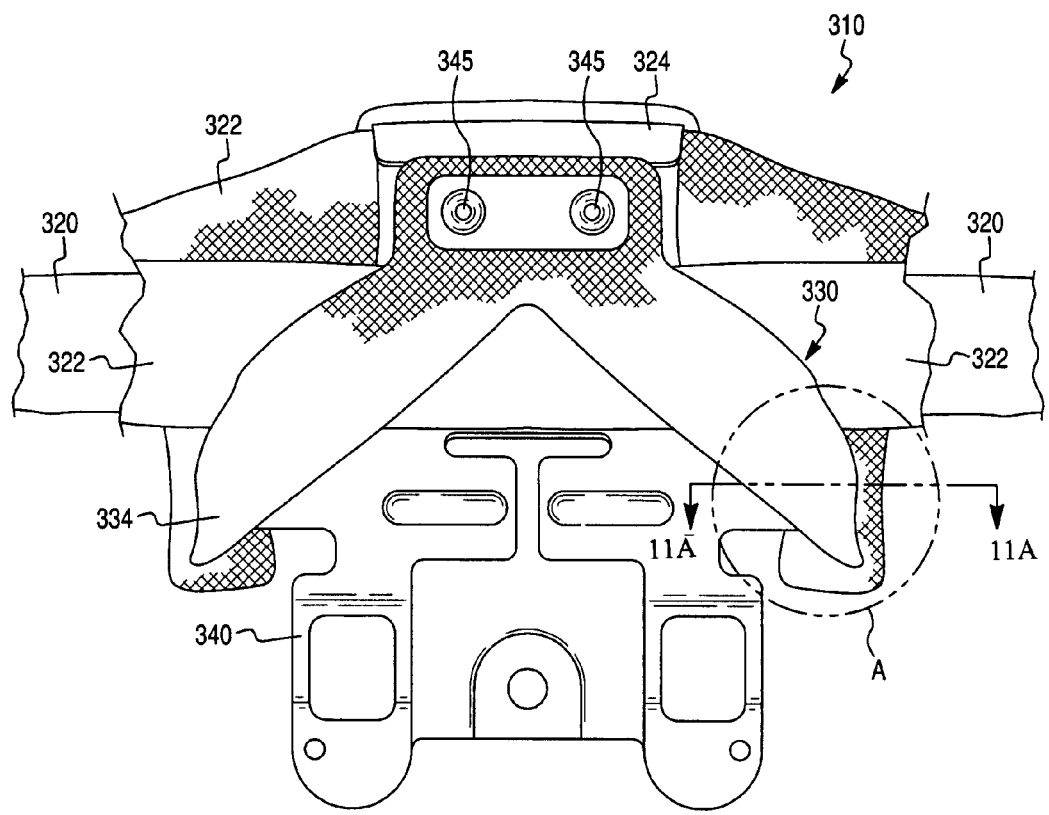
FIG. 11 is a perspective view of an embodiment of an airbag device according to the present invention.
Figure 12:
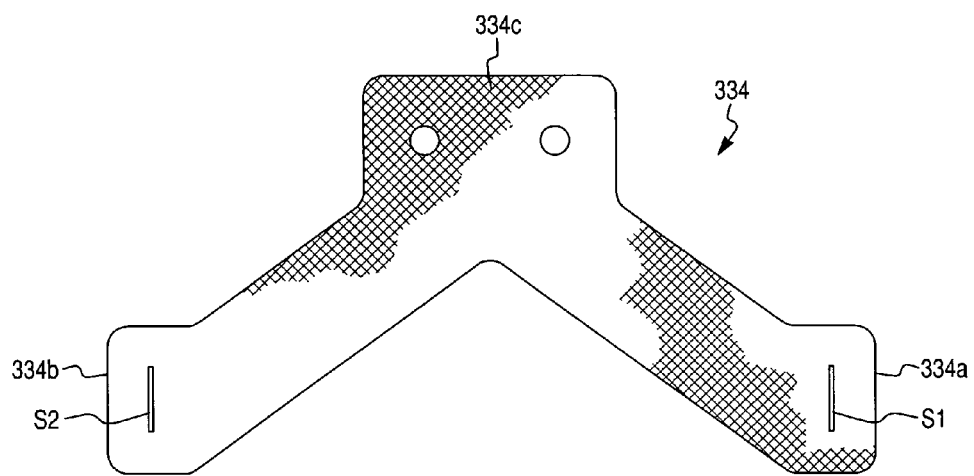
FIG. 12 is a top plan view of a strap of FIG. 11.

FIGS. 11-12 show a fourth embodiment of an airbag device 310 according to the present invention. The airbag device 310 includes an airbag 320 and a retention mechanism 330. The airbag device 310 is similar to the previous embodiments except the retention mechanism 330 is configured to engage a center bracket 340 to secure the airbag 320 to the center bracket 340.

Figure 11A:
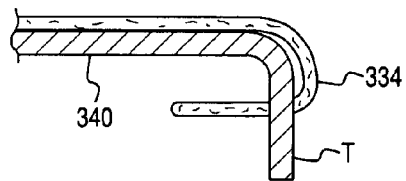
FIG. 11A is a cross sectional view of detail A taken along the line 11A-11A of FIG. 11.

The retention mechanism 330 includes a strap 334. The strap 334 has a Y-shaped configuration, as shown in FIG. 12. The strap 334 includes a first leg 334*a*, a second leg 334*b*, and a central portion 334*c* disposed between the first and second legs 334*a* and 334*b*. The first and second legs 334*a* and 334*b* are configured to connect to the bracket 340. For example, an end of the first leg 334*a* includes a slot S1, and an end of the second leg 334*b* includes a second slot S2. The slots S1 and S2 enable the strap 334 to engage with hooks or tabs T disposed on an underside of the center bracket 34, as shown in FIG. 11A.

In operation, the slot S1 is engaged with a first bracket tab T of the center bracket 340 by inserting the first bracket tab T in the slot S1. Similarly, the slot S2 is engaged with a second bracket tab T by inserting the second bracket tab T in the slot S2. Bag cover hooks (not shown) may then be secured over the bracket tabs T, and then a protector cloth 322 may be folded into place. An airbag tab 324 and the central portion 334*c* of the strap 334 are then fastened (e.g., riveted) with a fastener 345 to an upper portion of the center bracket 340, as shown in FIG. 11. In this manner, the strap 334 secures the airbag 320 and the protector cloth 322 in position against the center bracket 340. The center bracket 340 may then be connected to a vehicle structure to thereby securely install the airbag 320 in a vehicle.

The above-described embodiment is preferred for use with a side curtain airbag center bracket for attaching a side curtain airbag to a B pillar.

Figure 13:
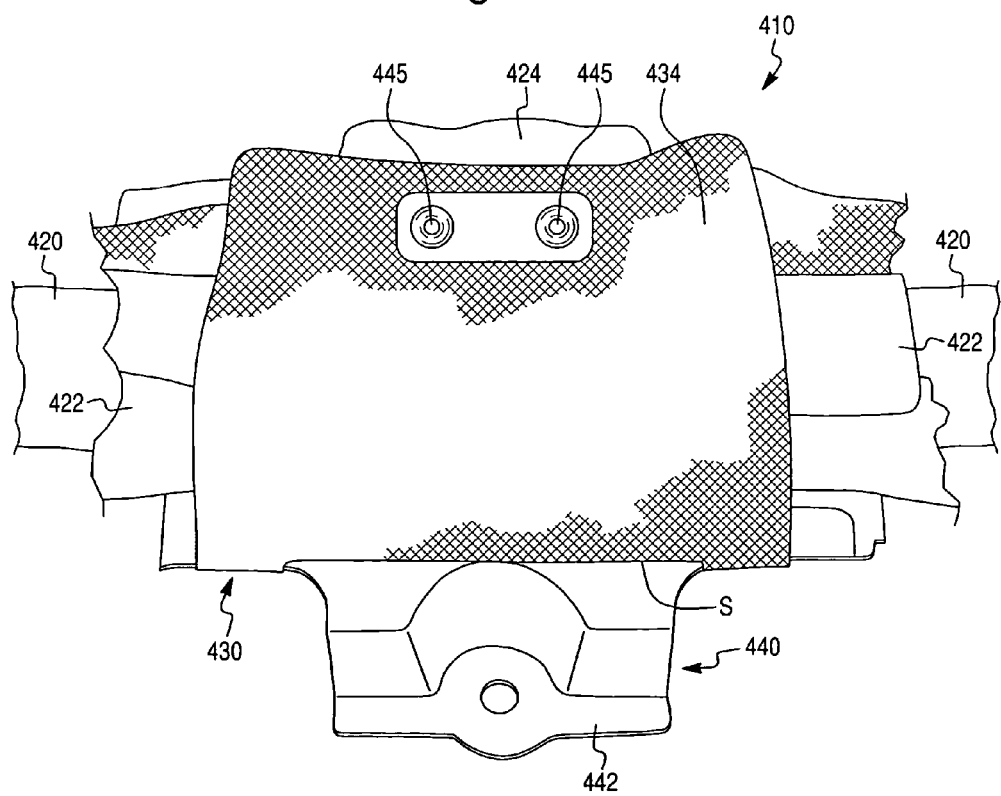
FIG. 13 is a perspective view of an embodiment of an airbag device according to the present invention.
Figure 14:
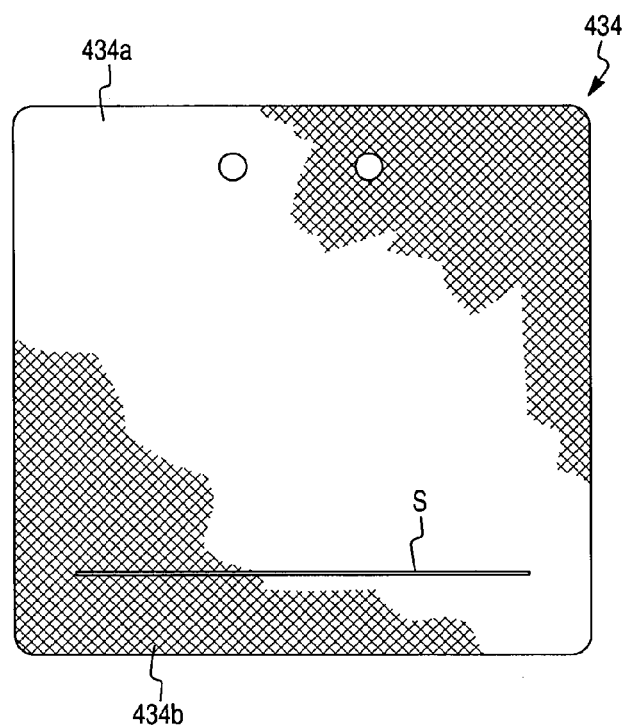
FIG. 14 is a top plan view of a strap of FIG. 13.

FIGS. 13 and 14 show a fifth embodiment of an airbag device 410 according to the present invention. The airbag device 410 includes an airbag 420 and a retention mechanism 430. The airbag device 410 is similar to the previous embodiments except the retention mechanism 430 is configured to engage a rear bracket 440 to secure the airbag 420 to the rear bracket 440.

The retention mechanism 430 includes a strap 434. The strap 434 includes a first end 434a and a second end 434b, as shown in FIG. 14. The second end 434b of the strap 434 includes a slot S configured to connect to the bracket 440. For example, the slot S may be sized to fit over a lower mounting feature 342 of the rear bracket 340, as shown in FIG. 13. Thus, the lower mounting feature 342 functions as a bracket tab that is received in the slot S.

In operation, the slot S of the strap 340 is engaged with the lower mounting feature 342 of the rear bracket 340 by inserting the lower mounting feature 342 in the slot S. The airbag 420 and a protector cloth 422 are folded into place. An airbag tab 424 and the first end 434a of the strap 434 are fastened (e.g., riveted) with a fastener 445 to the rear bracket 440, as shown in FIG. 13. In this manner, the strap 434 secures the airbag 420 and the protector cloth 422 in position against the rear bracket 440. The rear bracket 440 may then be connected to a vehicle structure to thereby securely install the airbag 420 in a vehicle.

The above-described embodiment is preferred for use with a side curtain airbag rear bracket.

Figure 15:
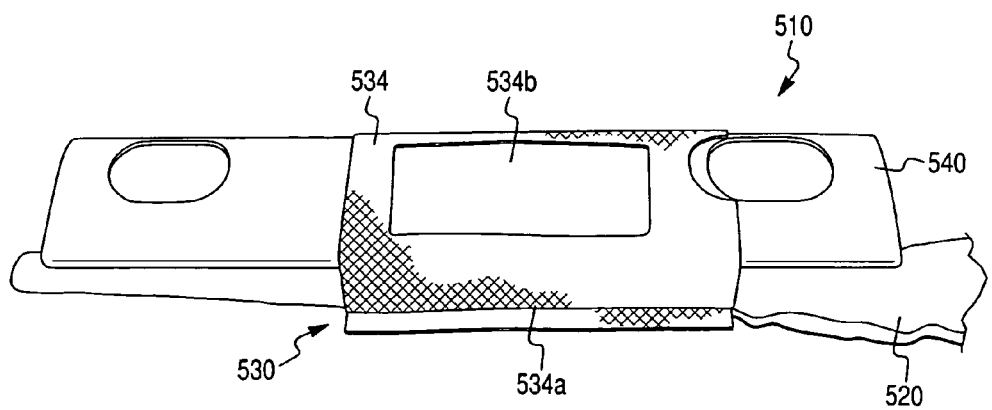
FIG. 15 is a perspective view of an embodiment of an airbag device according to the present invention.

FIG. 15 shows a sixth embodiment of an airbag device 510 according to the present invention. The airbag device 510 includes a airbag 520 and a retention mechanism 530. The airbag device 510 is similar to the previous embodiments except the retention mechanism 530 does not include a strap having a slot that engages a tab. Instead, the retention mechanism includes a strap 534 that is fastened about the airbag 520 and an energy absorbing member 540 by sewing.

As shown in FIG. 15, the strap 534 is wrapped about the airbag 520 and the energy absorbing member 540. The ends of the strap 534 are secured together by a sewing to form a sewn seam 534a. The seam 534a is positioned to enable the airbag 520 to deploy through the seam 534a. In this manner, the strap 534 secures the airbag 520 to energy absorbing member 540. The strap 534 may also include an aperture 534b so that an identification label affixed to the energy absorbing member 540 can be viewed through the strap 540.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag device, comprising:
   an airbag configured to inflate in an event of a vehicle emergency;
   a bracket for attaching the airbag to a vehicle structure; and
   a retention mechanism for securing the airbag in a folded storage position,
   wherein the retention mechanism comprises a strap including a slit, wherein the strap is wrapped around a portion of the airbag and the slit engages a tab thereby securing the strap in position.

2. The airbag device of claim 1, wherein the retention mechanism is non-adhesive.

3. The airbag device of claim 1, wherein the airbag comprises a side curtain airbag.

4. The airbag device of claim 1, wherein the strap comprises fabric.

5. The airbag device of claim 1, wherein the strap includes a tear seam.

6. The airbag device of claim 1, wherein the tab is disposed on the airbag and is configured to be connected to the bracket with a fastener.

7. The airbag device of claim 6, wherein the strap includes first and second ends configured to engage the tab.

8. The airbag device of claim 7, wherein first end of the strap includes a first slit and the second end of the strap includes a second slit.

9. The airbag device of claim 8, wherein the first slit is engaged with the tab of the airbag, the strap is wrapped around the portion of the airbag, and the second slit is engaged with the tab of the airbag to thereby secure the strap around the portion of the airbag.

10. The airbag device of claim 9, wherein a protector cloth is disposed between the strap and the airbag.

11. The airbag device of claim 1, wherein the tab is one of first and second connection tabs disposed on the airbag for connecting the airbag to the bracket, and the strap includes a first end configured to engage the first connection tab and a second end configured to engage the second connection tab.

12. The airbag device of claim 11, wherein the first end of the strap includes a first slit for receiving the first connection tab and the second end of the strap includes a second slit for receiving the second connection tab.

13. The airbag device of claim 12, wherein the first connection tab is received in the first slit and is connected to the bracket with a first fastener, the strap is wrapped around the airbag and the bracket, and the second connection tab is received in the second slit and is connected to the bracket with a second fastener to thereby secure the strap around the airbag and the bracket.

14. The airbag device of claim 11, wherein a protector cloth is disposed between the strap and the airbag.

15. The airbag device of claim 1, wherein the strap includes a first leg having a first slit, a second leg having a second slit, and a central portion disposed between the first and second legs.

16. The airbag device of claim 15, wherein the airbag and the central portion of the strap are attached to the bracket with a fastener.

17. The airbag device of claim 16, wherein the fastener comprises a rivet.

18. The airbag device of claim 15, wherein the tab is disposed on the bracket and is one of a first tab received in the first slit and a second tab received in the second slit to thereby secure the strap around the portion of the airbag.

19. The airbag device of claim 15, wherein the strap is formed in a Y-shape.

20. The airbag device of claim 15, wherein a protector cloth is disposed between the strap and the airbag.

21. The airbag device of claim 1, wherein the airbag and a first end of the strap are attached to an upper portion of the bracket with a fastener.

22. The airbag device of claim 21, wherein the fastener comprises a rivet.

23. The airbag device of claim 21, wherein the tab comprises a lower portion of the bracket.

24. The airbag device of claim 23, wherein the slit is disposed on a second end of the strap and the lower portion of the bracket is received in the slit to thereby secure the strap around the portion of the airbag.

25. The airbag device of claim 21, wherein a protector cloth is disposed between the strap and the airbag.

26. An airbag device comprising:
   an airbag configured to inflate in an event of a vehicle emergency; and
   a retention mechanism for securing the airbag in a folded storage position,
   wherein the retention mechanism comprises a strap including a slit, wherein the strap is wrapped around a portion of the airbag and the slit engages a tab thereby securing the strap in position, and
   wherein the retention mechanism includes a fastening member, and the tab is disposed on the fastening member.

27. The airbag device of claim 26, wherein the airbag device includes a bracket for attaching the airbag to a vehicle structure.

28. The airbag device of claim 27, wherein the fastening member, a first end of the strap, and the airbag are connected to the bracket with a fastener.

29. The airbag device of claim 28, wherein the fastener comprises a rivet.

30. The airbag device of claim 28, wherein the slit is disposed on a second end of the strap and the tab is received in the slit to thereby secure the strap around the portion of the airbag.

31. The airbag device of claim 28, wherein a second end of the strap further includes a second slit, and the fastening member further includes a second tab, wherein the tab is received in the slit and the second tab is received in the second slit to thereby secure the strap around the portion of the airbag.

32. The airbag device of claim 26, wherein the fastening member comprises metal.

33. An airbag device, comprising:
   an airbag configured to inflate in an event of a vehicle emergency;
   a bracket for attaching the airbag to a vehicle structure; and
   a retention mechanism for securing the airbag in a folded storage position,
   wherein the retention mechanism includes a strap wrapped around a portion of the airbag and a portion of the bracket, and
   wherein the retention mechanism includes a fastening member having a tab.

34. The airbag device of claim 33, wherein the retention mechanism is non-adhesive.

35. The airbag device of claim 33, wherein the airbag comprises a side curtain airbag.

36. The airbag device of claim 33, wherein the strap comprises fabric.

37. The airbag device of claim 33, wherein the strap includes a tear seam.

38. The airbag device of claim 33, wherein the fastening member, a first end of the strap, and the airbag are connected to the bracket with a fastener.

39. The airbag device of claim 38, wherein the fastener comprises a rivet.

40. The airbag device of claim 38, wherein a second end of the strap includes a slit and the tab is received in the slit to thereby secure the strap around the portion of the airbag and the portion of the bracket.

41. The airbag device of claim 38, wherein a second end of the strap includes a first slit and a second slit, and the fastening member further includes a second tab, wherein the tab is received in the first slit and the second tab is received in the second slit to thereby secure the strap around the portion of the airbag and the portion of the bracket.

42. The airbag device of claim 33, wherein the fastening member comprises metal.

* * * * *